Dec. 23, 1924.
I. V. RANDLE
DRINKING FOUNTAIN
Filed Dec. 1, 1923
1,520,441
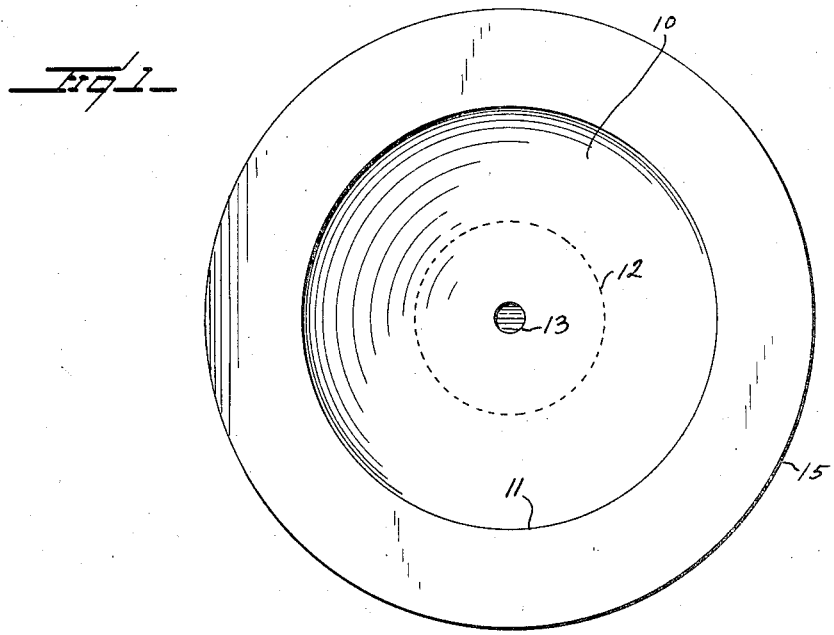
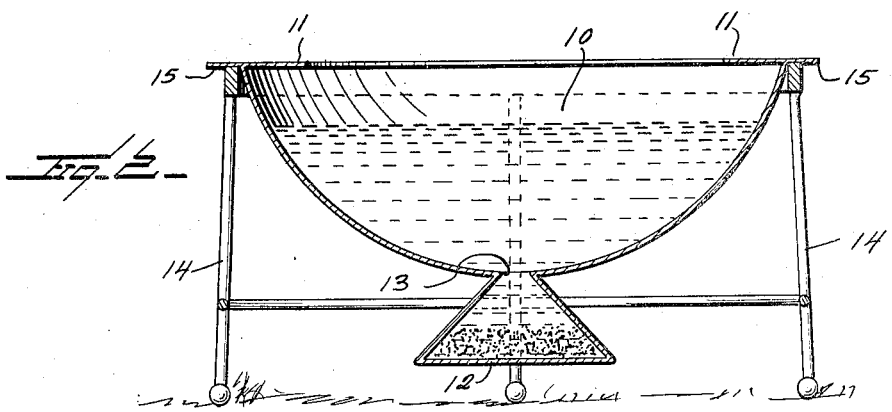
INVENTOR.
I. V. Randle
BY Watson E. Coleman
ATTORNEY.

Patented Dec. 23, 1924.

1,520,441

UNITED STATES PATENT OFFICE.

IRVING V. RANDLE, OF MERNA, NEBRASKA.

DRINKING FOUNTAIN.

Application filed December 1, 1923. Serial No. 677,976.

*To all whom it may concern:*

Be it known that I, IRVING V. RANDLE, a citizen of the United States, residing at Merna, in the county of Custer and State of Nebraska, have invented certain new and useful Improvements in Drinking Fountains, of which the following is a specification, reference being had to the accompanying drawings.

This invention relates to troughs or drinkings fountains for watering stock, poultry, and the like, and has for its object the provision of a novel trough so constructed that mud, foreign matter and sediment of all kinds will settle out of the main body of water so as to be inaccessible to the animals, the advantage being that the water will not become stirred up, muddy, or otherwise dirty, and consequently really unfit for drinking purposes.

An important and more specific object is the provision of a drinking fountain or basin which is formed with a bottom compartment within which all sediment accumulates gravitationally, the intention being that when this compartment contains a sufficient accumulation the device may be inverted to permit draining out of the sediment and preferably flushed to effect thorough cleansing.

An additional object is the provision of a device of this character which will be simple and inexpensive in manufacture, efficient and sanitary in use, durable in service, and a general improvement in the art.

With the above and other objects and advantages in view, the invention consists in the combination and arrangement of parts to be hereinafter more fully described and claimed and illustrated in the accompanying drawings in which:

Figure 1 is a plan view of the device.

Figure 2 is a vertical section therethrough.

Referring more particularly to the drawings, I have shown the trough as comprising a body 10 which might be elongated in shape and partially circular in cross section, though a convenient construction is to make the body 10 of purely circular shape in plan as well as section so that it will have a basin-like appearance. At its upper edge the body is preferably, though not necessarily, formed with an inwardly extending peripheral flange 11 which will operate to prevent splashing out of the water in case the device is tilted to a limited extent by the movements of animals or poultry slaking their thirst. The essential feature lies in the provision of a sub-chamber, reservoir or compartment 12 which is formed or secured upon the underside of the body or basin 10 at the center thereof and which is of frusto-conical shape in the event that the basin 10 is circular. If the basin or trough 10 should be elongated in form it is obvious that the sub-chamber 12 would then be of frusto-pyramidal shape. However, it is believed that the mere matter of shape is, to a great extent, immaterial as it does not affect the main principles of the invention. The size of the sub-chamber or compartment 12 is capable of wide variation, though in ordinary practice it need have only a fraction of the volume of the body or basin 10 as it is designed to receive only whatever sediment or foreign matter is present in or enters the main body or trough. At the center of the basin or body 10 is an opening 13 which communicates with the compartment 12 so that any grit, dirt, excrementitious matter and the like falling into the basin, as frequently occurs, may pass freely into the compartment 12 and be prevented from muddying or dirtying the water In actual practice the basin 10 and compartment 12 might be constructed integrally from sheet-metal or they may be formed of the desired number of parts soldered or otherwise suitably secured to make them liquid-tight at the joints. Practically, galvanized iron should be a suitable material though there is no limitation in this respect any more than there is in the size and shape.

It is of course obvious that some means should be provided for preventing the device from tipping over and this might be taken care of in any one of many different ways though I have illustrated a species of stand or base indicated by the numeral 14, which is of such a nature as to be capable of disposition upon the ground or other surface and to be arranged in such a way as to engage beneath an outwardly extending flange 15 at the upper edge of the basin or trough. Naturally, this stand might be secured to the device though it is really better to have it separate inasmuch as it then becomes a very simple matter to lift out the trough and invert it to permit draining out of any sediment which may have accumulated within the compartment 12. To effect thorough cleansing it is a simple matter to flush out the interior of the compartment 12 so that the entire device may be easily kept in a thoroughly sanitary condition.

While I have shown and described the preferred embodiment of my invention, it is of course to be understood that I reserve the right to make such changes in the form, construction and arrangement of parts as will not depart from the spirit of the invention or the scope of the subjoined claim.

I claim:

In a drinking fountain, a basin formed as a section of a hollow sphere and formed at its upper edge with an outstanding flange adapted for engagement upon a supporting stand, said upper edge being further formed with an inturned flange preventing splashing of water within the basin, and a sediment receiving chamber formed as a frusto-conical shell member beneath the central point of the under side of the basin and communicating therewith through a constricted opening whereby escape of sediment accumulated within the chamber will be prevented.

In testimony whereof I hereunto affix my signature.

IRVING V. RANDLE.